United States Patent [19]

Betterton et al.

[11] Patent Number: 4,643,026
[45] Date of Patent: Feb. 17, 1987

[54] COMPOSITE FASTENING DEVICE

[75] Inventors: Joseph T. Betterton, Arab; Alfred H. Glover, Decatur, both of Ala.

[73] Assignee: Chrysler Motors Corporation, Highland Park, Mich.

[21] Appl. No.: 796,336

[22] Filed: Nov. 12, 1985

[51] Int. Cl.⁴ .................... G01L 7/16; G01L 19/14
[52] U.S. Cl. .................................. 73/431; 73/744; 73/756
[58] Field of Search ............ 73/746, 431, 741, 744, 73/745, 146.8, 756; 200/83 R

[56] References Cited

U.S. PATENT DOCUMENTS

| | | | |
|---|---|---|---|
| 3,069,645 | 12/1962 | Henke | 338/39 |
| 3,098,209 | 7/1963 | Stevens | 338/39 |
| 3,600,535 | 8/1971 | Bergsma et al. | 200/83 R |
| 3,600,950 | 8/1971 | Bergsma | 73/398 |
| 3,969,991 | 7/1976 | Comstock et al. | 92/99 |
| 4,543,833 | 10/1985 | Ferguson | 73/741 |

Primary Examiner—Donald O. Woodiel
Attorney, Agent, or Firm—Kenneth H. MacLean, Jr.

[57] ABSTRACT

In a vehicle having an internal combustion engine, it is usual to monitor the oil pressure of the engine's lubrication system to prevent damage to the engine in the event the oil pressure decreases to an unacceptable level. In this regard, a gauge or a warning light on the vehicle dashboard indicates when the oil pressure is low in response to a signal from an oil pressure transducer connected to the engine lubrication system. Herein is described an improved oil pressure transducer with a relatively easily crushable thin metal base housing member. The base housing portion is generally hollow and includes a threaded male support portion adapted to be received in a threaded aperture of the engine and fluidly communicated with the lubrication system. The base includes a molded wrenching portion of elastomeric material formed about the housing for contact by an installation tool. The molded wrenching portion is shaped on its outer circumference so as to facilitate rotation of the transducer by tool means without damage to the thin metal wall thereof.

3 Claims, 7 Drawing Figures

COMPOSITE FASTENING DEVICE

BACKGROUND OF THE INVENTION

In motor vehicles, oil pressure transducers have previously utilized a construction with a two-part housing capturing a flexible diaphragm member therebetween. The diaphragm is movable in response to the pressure of engine oil in the lubrication system so as to operate warning switch means. The switch means are connected into a warning circuit so that when oil pressure falls below a desired minimum level, a warning light or the like is activated. The two-part housing is joined together about the aforementioned diaphragm by means of a crimping operation in which an edge portion of one housing portion is rolled or turned over in a mechanically deforming operation about a flange portion of the other housing part.

Previous oil pressure transducers have utilized a base housing portion including a threaded male end portion adapted to be received in a threaded aperture of the engine which fluidly communicates with the lubrication system of the engine. The prior transducers have utilized housing bases with relatively thick walls made by turning and cutting a solid metal cylinder on a screw machine or the like. This produces a relatively thick walled and heavy part. Obviously, another disadvantage of this type of housing is the high cost in machining the housing on the aforementioned screw machine. It has been found that a base housing can be easily formed without machining and with thin walls by cold forming. However, this type of housing lacks a relatively thick wall or a large diameter circumferential surface such as a hexagonal surface which can be utilized to rotate the transducer by a wrench or the like. The subject application describes a housing with a thin walled portion and with a desirable circumferential surface formed thereon defining a wrenching portion. The wrenching portion is formed by a molded elastomeric material or the like and has desirable wrenching surfaces formed thereon. The wrenching portion may be manufactured separately and subsequently joined to the housing by a press fit or by adhesives or the wrenching portion may be mold formed about the base housing.

Therefore, an object and advantageous feature of the subject transducer is the provision of a hollow base housing which is adapted to be threadably and insertably mounted on an engine in fluid communication with the engine lubrication system, the base being of desirably light and inexpensive thin walled and easily formed material, the base having an annularly shaped wrenching portion formed thereabout to rotate the transducer by use of an installation tool without crushing the housing. A further advantageous feature and object of the subject application is the provision of an oil level transducer with a hollow base housing portion adapted for threadably securing the base to an engine and with the base of desirably thin walled and easily formed material encircled by a wrenching portion of diverse material.

Other advantageous features of the subject transducer will be more readily apparent from a reading of the following Detailed Description of a Preferred Embodiment, reference being had to the accompanying drawings in which preferred embodiments are illustrated.

IN THE DRAWINGS

DETAILED DESCRIPTION OF A PREFERRED EMBODIMENT

Figure 1:
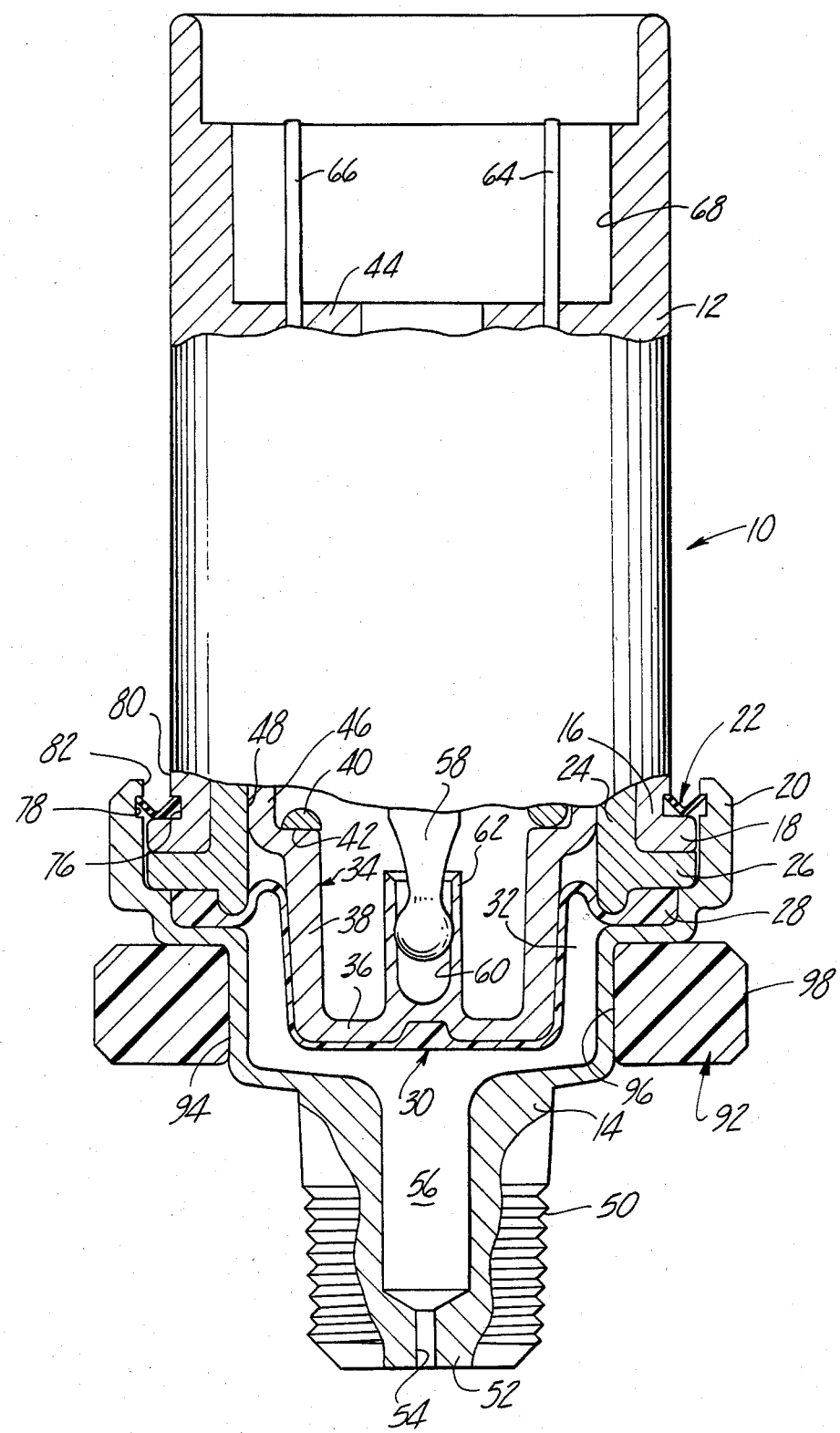
FIG. 1 is a partially sectioned and elevational view of the subject pressure transducer with portions broken away to reveal the features discussed heretofore.

In FIG. 1, an oil pressure transducer 10 is illustrated. The pressure transducer 10 includes an upper housing portion 12 and a lower housing or base portion 14. The upper housing 12 has a lower end portion 16 terminating in a radially outwardly extending flange portion 18. The lower housing or base 14 includes an enlarged diameter upper end portion 20 which encircles the flange portion 18 of the upper housing. The housing portions 12 and 14 are telescoped together and established axially one to another by means of an annular retainer ring 22 to be described in more detail hereinafter.

The housings 12 and 14 cooperate together to retain a generally cylindrical sleeve member 24 or, more specifically, by contacting a radially outwardly extending flange portion 26. The flange portion 26 of sleeve 24 also engages an outer peripheral edge portion 28 of a resilient elastomeric diaphragm member 30 extending across the hollow midportion or space 32 of the transducer. The diaphragm 30 has sufficient surface to overly or cover a substantial portion of a generally cup-shaped end of a piston member 34. Specifically, the end portion 36 of the piston 34 and a substantial portion of the lower side wall 38 of piston 34 is contacted by the central portion of the resilient diaphragm 30. The piston 34 is biased downward toward lower housing 14 by a coil type spring 40 which rests against a shoulder portion 42 of the piston 34. The upper end of the coil spring (not visible) rests against a transverse wall portion 44 of the upper housing 12. An upper cylindrical side wall 46 of piston 34 slidably engages the inner cylindrical surface 48 of sleeve member 24.

The lower housing or base 14 is provided with threaded means 50 on an end portion 52 adapted for threadably joining with a similarly threaded aperture of an engine to mount the transducer. An oil inlet passage 54 is formed in the threaded end 52 for communication with the engine oil lubrication system. Passage 54 in turn communicates with the interior space 56 formed by the base 14 and the diaphragm 30. Pressurized oil from passage 54 generates a force on the diaphragm 30 and hence on piston 34 against spring 40. This force tends to move piston 34 upward in FIG. 1 to a position proportional to the oil pressure.

The tranducer includes an axially movable central stem and switch activating portion 58 relative to sleeve 24 and housing 12. The lower end of portion 58 is retained within a bore 60 formed in an upwardly extending tower portion 62 of the piston 34. When piston 34 moves upward, the portion 58 is also moved therewith to produce the aforedefined switching functions. In this regard, electrical terminals 64 and 66 are shown within a recess 68 at the upper end of housing 12. The terminals 64 and 66 are adapted to be connected to an oil pressure warning circuit of the vehicle.

As previously stated, the housing portions 12 and 14 are secured together by means of an annularly shaped retainer 22. The retainer shown in FIG. 1 is better illustrated in FIG. 2. The cross sectional view shows a generally V-shaped configuration with a lower central portion 70, an inner leg portion 72 and an outer leg portion 74. The leg portions 72 and 74 are resiliently connected together at the midportion 70 so that the leg portions may flex radially inwardly and outwardly to a desired extent. Referring to FIG. 1, the upper housing 12 includes an undercut portion or channel 76 circumferentially extending in its outer surface adjacent the flange portion 18. Likewise, a similar channel 78 is formed in the inside diameter surface portion of the end 20 of the base 14. The channels 76 and 78 are axially aligned when the upper and lower housings 12 and 14 are fitted in desired axial position. When the housings are placed in the position, the annularly shaped retainer 22 can be easily inserted in the slight radial space between surfaces 80 and 82 of the housings 12 and 14, respectively. During insertion of the retainer 22, the inner and outer diameter legs 72 and 74, respectively, are flexed toward one another caused by the close spacing between surfaces 80 and 82. When the midportion 70 of the retainer approaches flange 18, the legs 72 and 74 then expand radially away from one another into the channels 76 and 78, respectively. Henceforth, retainer 22 axially secures the housing portions 12 and 14. As a result, non-destructive removal of the retainer 22 is very difficult if not impossible.

Figure 2:
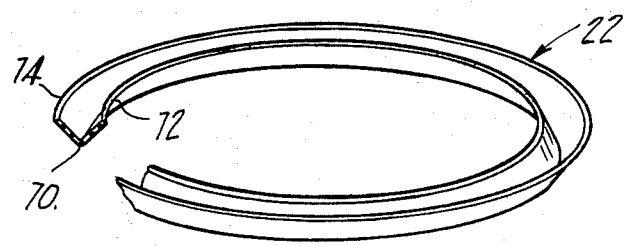
FIG. 2 is a perspective view of a V-shaped securing or retaining member shown in FIG. 1.
Figure 3:
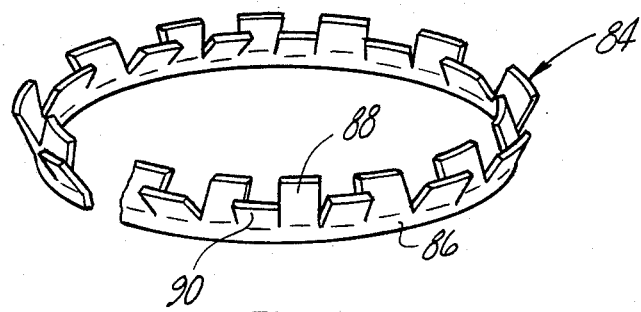
FIG. 3 is a perspective view of a modified V-shaped retaining member of the member shown in FIG. 2.

In FIG. 3, a modified retainer 84 is illustrated which may be used in place of retainer 22 shown in FIGS. 1 and 2. Retainer 84 is formed from a ring or band of material 86 which preferably is of metal. Alternately inwardly and outwardly projecting leg portions 88 and 90 are formed from the upper edge portion of band 86 by a series of axially extending cuts or separations of the material. The cuts extend a substantial portion of the width of band 86 leaving a relatively small uncut lower portion which joins the legs 88 and 90. The retainer 84 functions exactly as the retainer 22 to secure the housings with its inner and outer leg portions 88 and 90 being flexed toward one another when the retainer 84 is inserted between surfaces 80 and 82. Likewise, the leg portions 88 and 90 expand away from one another when the lower edge of retainer 84 approaches the upper surface of flange 18.

Figure 4:
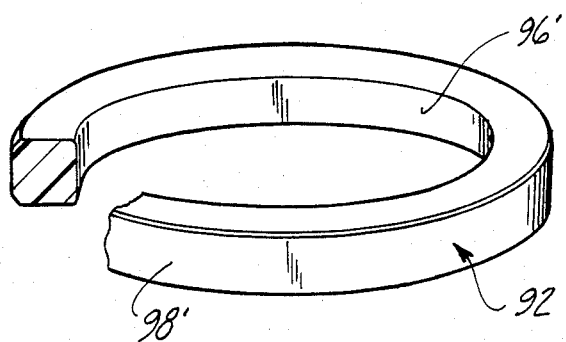
FIG. 4 is a perspective view of an annular member to form the wrenching portion shown in FIG. 1.
Figure 5:
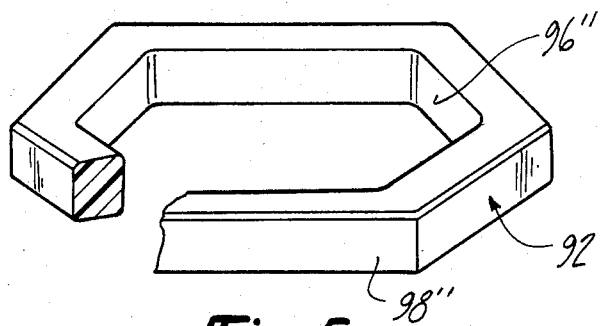
FIG. 5 is a perspective view of a modified wrenching portion related to the member shown in FIG. 4.

As previously stated, the transducer is mounted on the vehicle engine by rotating the base portion 14 to cause the threaded end portion 52 thereof to join a similarly threaded aperture of the engine. Because the thin walls of the housing and base 12 and 14 are easily crushed or damaged, it is undesirable to apply a rotating tool or wrench to the outer surface thereof. Therefore, the transducer has wrenching portion 92 encircling the base portion 14. Specifically, the wrenching portion 94 may be separately mold formed or extrusion formed of plastic or elastomeric material and placed in encircling relation to the circumferential surface 94 of the lower housing 14. The wrenching portion 92 may also be formed of sintered powder metal material if desired which is molded right around the housing portion 14 or formed separately. In FIGS. 4 and 5, two embodiments of wrenching portion 92 are shown. In FIG. 4, the wrenching portion displays an inner cylindrical surface 96' and in FIG. 5, the inner surface displays a hexagonal surface 96''. Likewise, in FIG. 4 the wrenching portion displays a generally cylindrical outer surface 98' and in FIG. 5, the outer surface 98'' displays a hexagonal surface adapted to be readily engaged by a wrench type of tool.

In either of the configurations shown in FIGS. 4 and 5, the wrenching portion 92 is formed of relatively inexpensive material which is easily formed by known means such as molding, extrusion or sintering. The wrenching portion 92 is secured about the lower housing or base portion 14 by either a press fit, heat shrinking the member thereon or by utilization of some fastener such as various known adhesives. The use of a diverse wrenching portion prevents damaging the relatively thin walled housing particularly in the vicinity of the wrenching member 92 in FIG. 1. This permits the use of various manufacturing techniques for forming the thin walled base 14, including cold forming, spinning or similar low cost forming operations as opposed to metal cutting by the use of a screw machine or the like which is a relatively expensive manufacturing operation and produces relatively thick walls. These manufacturing operations are known in the art.

Figure 6:
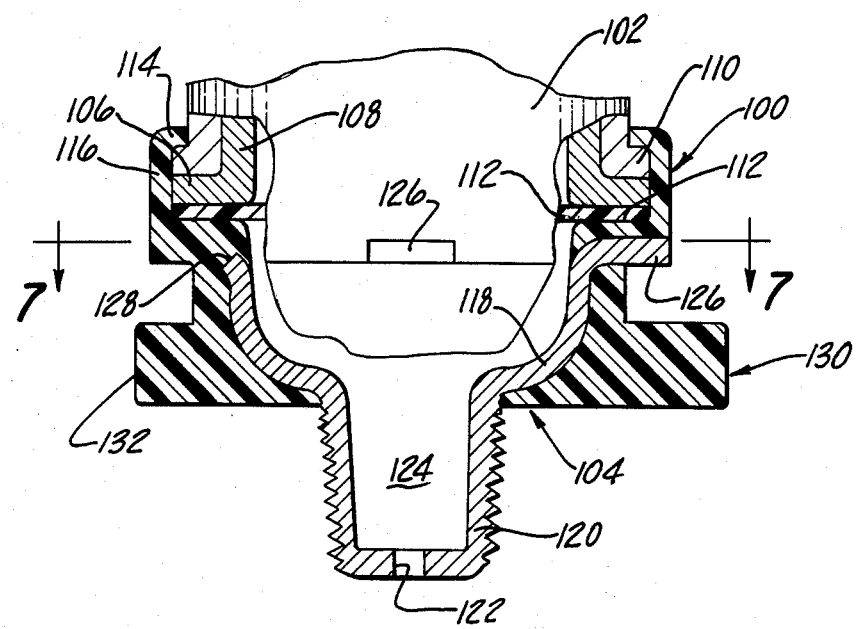
FIG. 6 is a partially sectioned view of a modified base portion of the transducer shown in FIG. 1.
Figure 7:
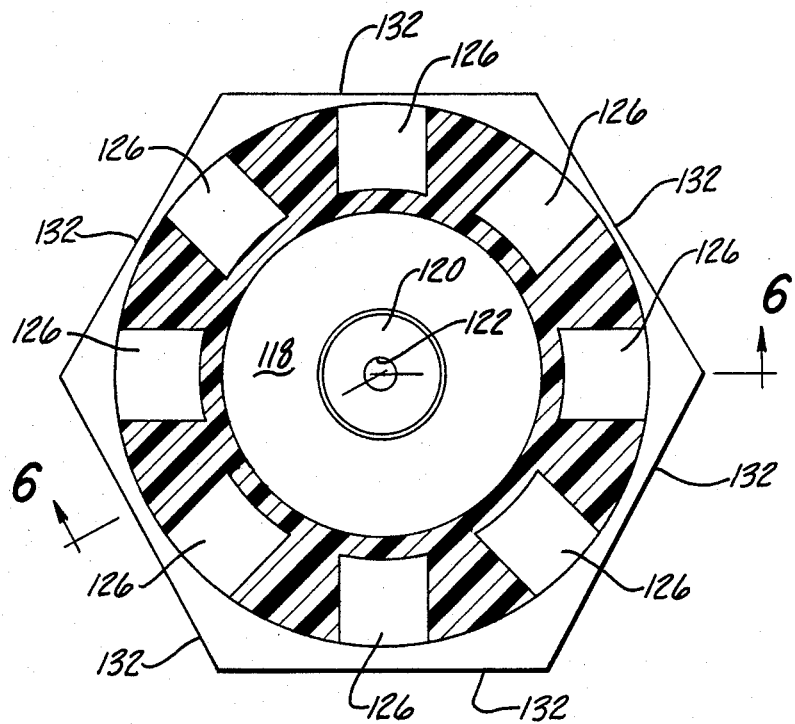
FIG. 7 is a sectioned view of the base portion taken along section line 7—7 in FIG. 6 and looking in the direction of the arrows.

In FIGS. 6 and 7, a modified transducer 100 is illustrated including upper housing 102 and a combination lower base and wrenching member 104. The housing 102 and member 104 retain therebetween a flange portion 106 of a sleeve member 108 and a peripheral edge portion 110 of a diaphragm 12. Specifically, a radially outwardly directed flange 110 of housing 102 engages the portion 106 of sleeve 108. A shoulder surface 112 of member 104 engages the edge portion 110 of diaphragm 112. Members 102 and 104 are axially retained together by a rolled or turned over portion 114 of an upper cylindrical extension 116 of member 104.

The combination wrenching portion and base 104 includes a thin walled and hollow metal member 118. Member 118 is preferably made using the aforedescribed cold forming, spinning, sintering or similar low cost operation. Member 118 includes a lower threaded end portion 120. End portion has inlet passage 122 therethrough and fluidly connected to interior space 124 of the transducer 100.

The upper end of member 118 is formed with spaced and radially outwardly extending tabs 126, perhaps best shown in FIG. 7. Between tabs 126, the upper end terminates at slightly outwardly directed edges 128. The tabs 126, edges 128 and adjacent portions of the member 118 below are intimately associated with an elastomeric wrenching portion 130 which is conveniently mold formed over and around member 118. Wrenching portion 130 is configured in a hexagonally shaped form with wrench or installation tool surfaces 132 arranged around the member 118.

It can be readily understood that the combination wrenching portion and base 118 described heretofore provides a desired thin walled housing or base carrying a threaded end for supporting the transducer on the engine. Also, the intimate forming of the wrenching portion 130 around and about the tabs 126 and edges 128 provides a structure which resists relative rotational movement between portions 118 and 130. Resultantly, an installation tool such a a wrench or a rotary power tool engages only the wrenching portion to prevent crush related damage to the thin walled base housing.

Although only relatively few modifications and embodiments of the transducer have been discussed, other modifications will be readily apparent to one skilled in the art which still fall within the scope of the following claims which describe the invention.

We claim:

1. A fluid pressure transducer with a relatively easily crushed thin walled housing means and a threaded portion thereof for rotation into a similarly threaded aperture of a support, the housing means having an improved wrenching portion for non-destructive engagement by an installation tool in which the housing means is thin-walled and generally cup-shaped with an axially directed generally cylindrical portion and a radially outwardly directed end portion with axially facing surfaces;

a wrenching means molded intimately around the housing's axially directed portion and on both axially facing surfaces;

interruption means of the housing's radially outwardly directed end portion permitting portions of the wrenching means on each side of the axially facing surfaces of the housing means to be joined by integral portions of the wrenching means.

2. The transducer set forth in claim 1 in which the radially outwardly directed end portion and interruption means are in the form of a plurality of circumferentially spaced tabs with spaces therebetween for extension of the molded wrenching material over the pair of opposite axially facing surfaces and the pair of opposite side edge surfaces of the tabs.

3. A fluid pressure transducer with a relatively easily crushed thin walled housing means and a threaded portion thereof for rotation into a similarly threaded aperture of a support, the housing means having an improved wrenching portion for non-destructive engagement by an installation tool, comprising:

thin walls of the housing means configured and formed insufficiently to resist crush related damages by constrictive forces applied thereon by the installation tool in rotating the transducer into fully threaded engagement with the support;

the housing means having a generally axially directed circumferential walled surface and an adjacent radially directed walled surface;

an annularly shaped wrenching member with a radially inner surface grippingly engaging the axially directed circumferential surface of the housing means and molded in situ about the housing member, a radially outer circumferential surface for application of the installation tool and spaced from the radially inner surface sufficiently to provide sufficiently tough and crush resistant structure to be acted on by the installation tool, and an axially facing end surface engaging the radially directed housing surface to impart sufficient resistance to relative rotation between the housing means and the wrenching portion during a rotationally threaded mounting of the transducer to the support.

* * * * *